United States Patent
Barrenscheen et al.

(10) Patent No.: US 6,912,566 B1
(45) Date of Patent: Jun. 28, 2005

(54) MEMORY DEVICE AND METHOD FOR OPERATING THE MEMORY DEVICE

(75) Inventors: Jens Barrenscheen, München (DE); Gunther Fenzl, Höhenkirchen-Siegerstbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/124,288

(22) Filed: Jul. 28, 1998

(51) Int. Cl.[7] ............................................. G06F 15/167
(52) U.S. Cl. ..................................... 709/215; 709/234
(58) Field of Search ................................. 709/213, 214, 709/215, 216, 234, 232, 253; 710/52, 53, 56, 58, 106, 105, 129, 57; 370/506

(56) References Cited

U.S. PATENT DOCUMENTS

| | | | |
|---|---|---|---|
| 4,158,235 A | | 6/1979 | Call et al. |
| 4,965,794 A | * | 10/1990 | Smith .......................... 370/506 |
| 5,619,653 A | * | 4/1997 | Kawauchi .................... 709/213 |
| 5,623,700 A | * | 4/1997 | Parks et al. .................... 710/53 |
| 5,732,286 A | * | 3/1998 | Leger ........................... 710/57 |
| 5,748,923 A | * | 5/1998 | Eitrich ........................ 710/129 |
| 5,859,980 A | * | 1/1999 | Kalkunte ................ 395/200.61 |
| 5,884,099 A | * | 3/1999 | Klingelhofer ................. 710/52 |
| 5,931,926 A | * | 8/1999 | Yueng et al. .................. 710/52 |
| 5,941,966 A | * | 8/1999 | Gotze et al. ................. 710/105 |
| 5,987,554 A | * | 11/1999 | Liu et al. .................... 710/129 |

FOREIGN PATENT DOCUMENTS

| | | | |
|---|---|---|---|
| EP | 0419067 A2 | * | 3/1991 |
| WO | 97/33230 | * | 9/1997 |

OTHER PUBLICATIONS

"Software–Controlled Wrap–Around Buffer", IBM Technical Disclosure Bulletin, vol. 28, No. 12, May 1986, pp. 5314–5316.

Tam–Anh Chu et al.: "Design of VLSI Asynchronous FIFO Queues for Packet Communication Netowrks", XP–000756967, IEEE, 1986, pp. 397–400.

"Can–Controller Area Network", Wolfgang Lawrenz, Hüthif verlag, 1997, coverpage.

S.G. Tzafestas: "On the Design of Multi–Imput Periodic–Block–Output Buffers with Binonial Feedback", XP–002123624, pp. 120–125.

* cited by examiner

*Primary Examiner*—Patrice Winder
(74) *Attorney, Agent, or Firm*—Laurence A. Greenberg; Werner H. Stemer; Gregory L. Mayback

(57) ABSTRACT

The memory device, for the purpose of serial data transfer of binary data, is arranged between at least two subscribers of a data transmission system. The memory is divided into a multiplicity of memory objects, which are typically of the same size and some of which are organized to form FIFO structures. The FIFO structures are used to buffer the typically asynchronous access operations between the subscribers at different data transmission rates and with a certain data depth, and to thereby decouple them from one another. The data transfer is largely under data control and thus requires minimal computation complexity in a central processing unit. The memory objects of the memory can advantageously be operated flexibly and independently of one another, in four different operating modes.

35 Claims, 5 Drawing Sheets

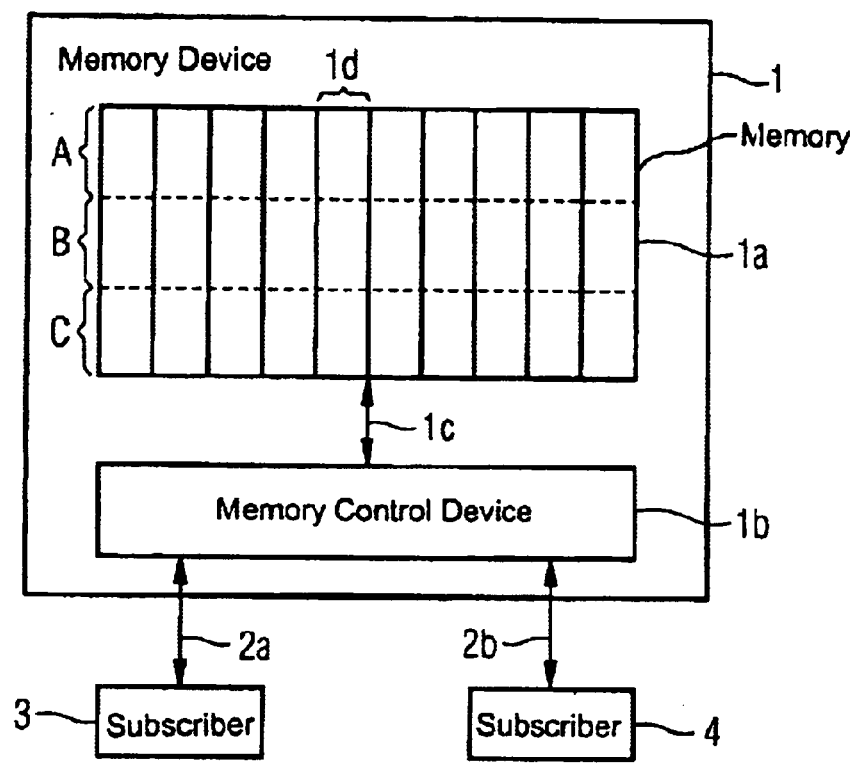

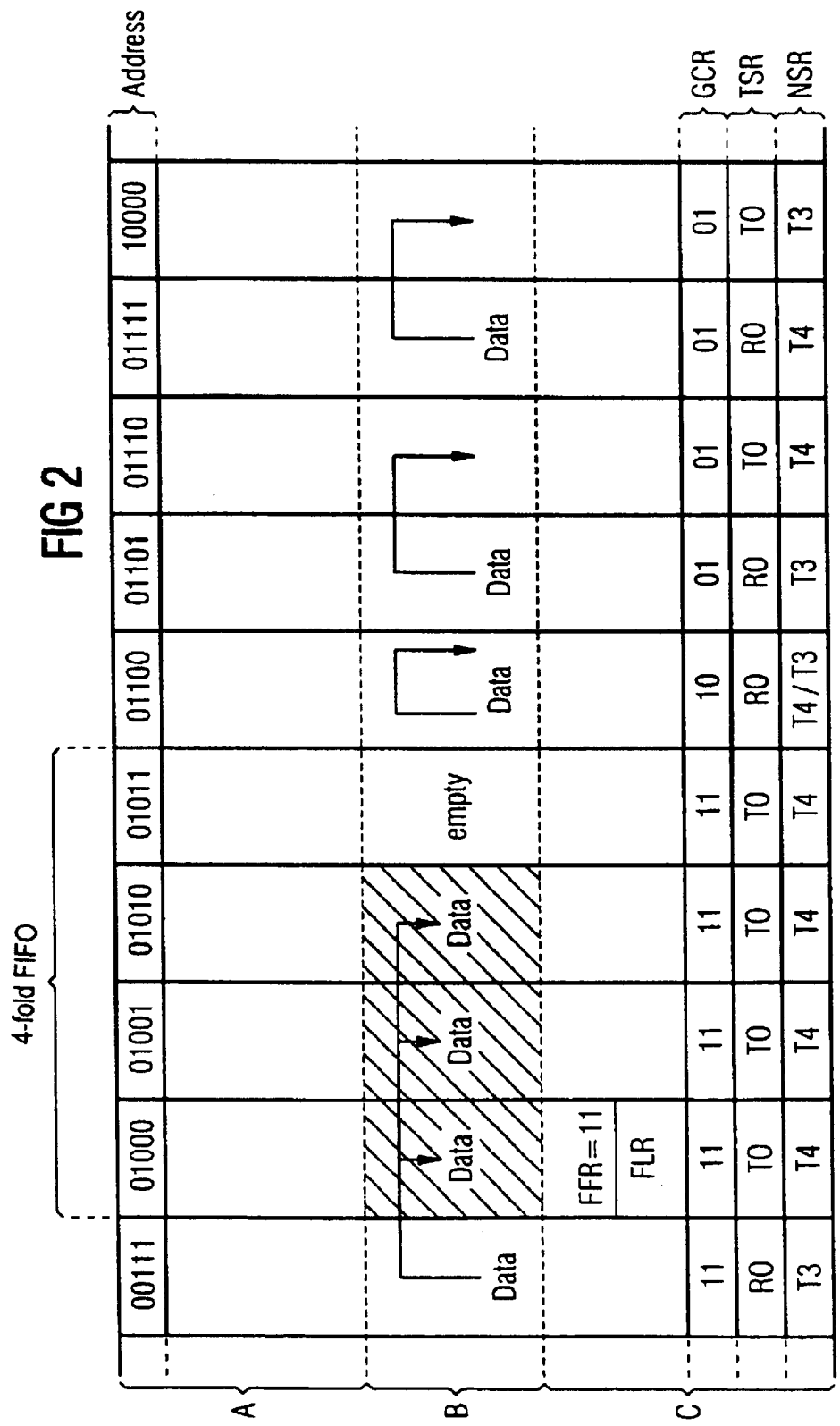

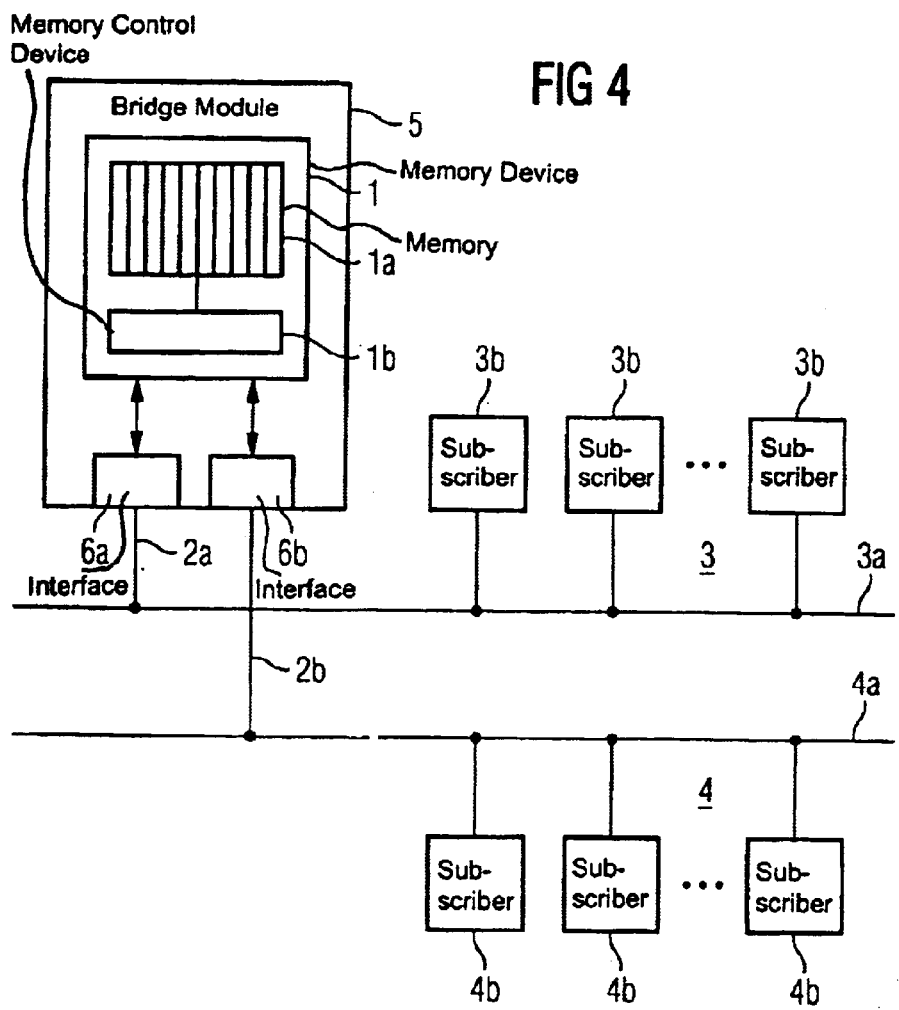

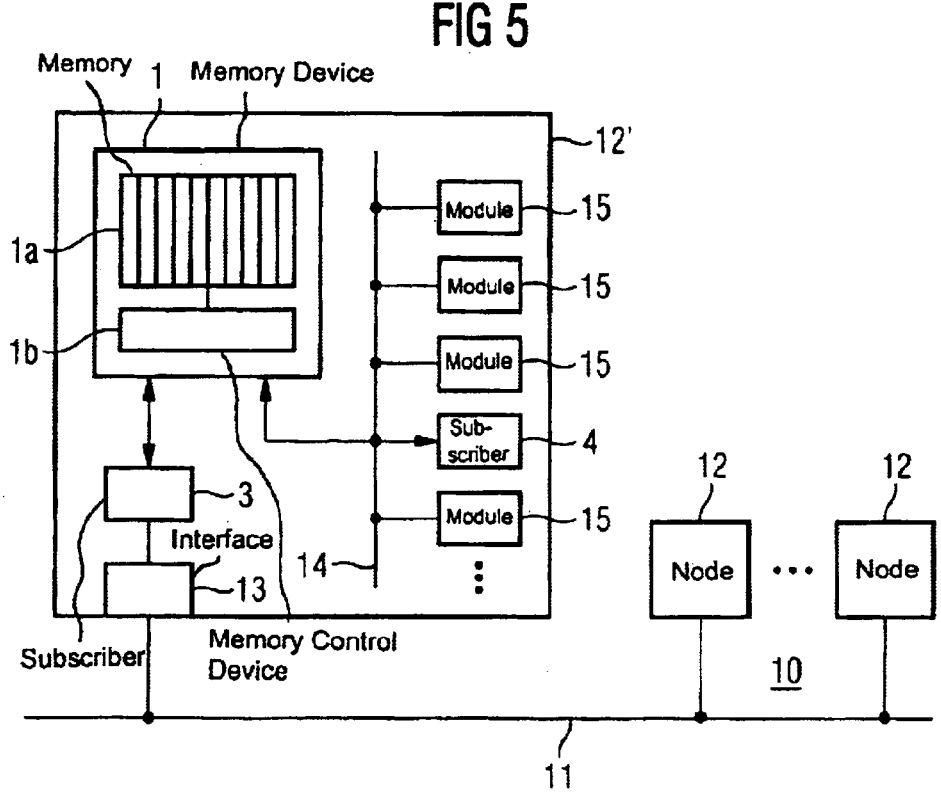

MEMORY DEVICE AND METHOD FOR OPERATING THE MEMORY DEVICE

BACKGROUND OF THE INVENTION

Field of the Invention

The invention relates to a memory device which, for the purpose of serial data transfer of binary data, is connected between two or more subscribers of a data transmission system. The memory device has a multiplicity of memory objects, preferably of equal size, that are identifiable by their address. The data width in each memory object corresponds at least to a predetermined data width of a data object intended for data transfer. A plurality of memory objects form a FIFO (first-in, first-out) structure. The invention also relates to a method for operating the memory device.

Bus systems are being used increasingly frequently for networking of distributed communications systems, for the purpose of data communication between different communications stations. In such bus systems, which are used particularly advantageously in motor vehicle electronics, a communications station communicates via a data bus with at least one other communications station which is connected to the same data bus. The bus system, in which various communications stations communicate with one another via a data bus as the communications medium, can be implemented, for example, in a known manner as a Controller Area network (CAN bus system) which is described in detail, for example, in "CAN-Controller Area Network: Grundlagen und Praxis [Principles and Practice]", Wolfhard Lawrenz (publisher), 2d ed., Hüthig-Verlag, 1997.

Various processors are used in a CAN bus system owing to the multiplicity of communications stations, which are called network nodes here. In each of the network nodes, the central processor unit (CPU) of the corresponding processor then communicates with the respective CAN controller which, for its part, is coupled to the data bus. Owing to the different computation load on the various network nodes, resulting from the different computation performances of the corresponding central processor units in the corresponding processors at these network nodes, and owing to the normally defined transmission rate of the data bus which is connected to the CAN controller, a situation often arises in which it is not possible for the respective network nodes to process in real time all the data to be transmitted via the data bus.

However, at present, the access events between the central processor unit and the CAN controller to data records can be decoupled only by joint software protocolling. However, this process is extremely complex and also requires the processors to have greater computation performance.

SUMMARY OF THE INVENTION

It is accordingly an object of the invention to provide a memory and a method of operating the memory, which overcomes the above-mentioned disadvantages of the prior art devices and methods of this general type and which allow a data transfer between a data transmitter and a data receiver that may be operated at different data transmission rates, in a simple manner and with as little hardware computation complexity as possible.

With the foregoing and other objects in view there is provided, in accordance with the invention, a memory device to be used in a data transmission system with at least two subscribers. The memory device is to be connected, for serial data transfer of binary data objects of a predetermined data width, between the at least two subscribers. The memory device comprises:
a multiplicity of memory objects each being identifiable by a respective address and, preferably being of equal size;
each said memory object having a data width being at least as large as a predetermined data width of a data object intended for data transfer;
at least one FIFO structure containing a plurality of said memory objects and transmitting data in a data-controlled data transfer controlled by the data objects being transmitted.

The memory device according to the invention and the method according to the invention for operating this memory device allow hardware decoupling of the data transfer between different subscribers to be undertaken in a simple manner and very flexibly. The data transfer takes place largely under data control and thus requires minimal computation complexity in a central processing unit.

The particular advantage of the present invention is thus that a programmable number of otherwise independent memory objects of a memory are organized to form FIFO structures. These FIFO structures allow successive data objects, which are intended to be transmitted by a data transmitter via the memory device to a data receiver, to be processed under data control with minimal software complexity and essentially under data control. The fundamental method for operating the memory device is referred to, in the following text, as the FIFO operating mode.

A further advantage of the FIFO structures results from the interaction with the respective other memory objects in the memory. In this case, for example, one subscriber can create data blocks in a FIFO structure and provide them for data transfer. The respective other subscriber can then access the messages stored in the FIFO structure and sequentially process the individual messages. This capability relieves the load on the internal program timing, since the first subscriber does not need to be synchronized to the second subscriber for each access.

Seen globally, these FIFO structures are used in particular to buffer the typically asynchronous accesses between the subscribers at a different data transmission rate and with a certain data depth, and in this way to decouple them from one another. Loss of data can thus be safely avoided.

In a further method for operating the memory device, the memory objects which are organized to form a FIFO can also advantageously be used independently of one another, in a known manner, as normal memory objects. This operating mode is referred to as the gateway operation.

In a particularly advantageous further development, the architecture of such a memory device arranged between two subscribers allows the two operating modes described above to be combined: on the one hand the conventional method of operating individual memory objects using the so-called gateway operating mode and, on the other hand, memory objects which can be configured by a program and which are operated in the FIFO mode. The particular advantage of this so-called FIFO gateway operating mode is the high level of flexibility and the low additional level of hardware and software complexity in complex data transfer systems.

The invention is particularly advantageous in a bus system that is designed, for example, as a so-called CAN bus system that is suitable for use in a motor vehicle power supply system. In a CAN bus system, the memory device can be used to buffer the data transfer between the central processing unit and the CAN controller of a network node.

Furthermore, networked systems having a plurality of bus systems are now being used increasingly. In the process, there is, of course, also an increase in the need for communications subscribers to different bus systems to be able to communicate with one another. A memory device which is integrated in a bridge module can advantageously be used for buffering the data transfer between the various bus systems, which are operated, for example, at different data transmission rates.

Other features which are considered as characteristic for the invention are set forth in the appended claims.

Although the invention is illustrated and described herein as embodied in a memory device and method for operating the memory device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram showing a memory device according to the invention between two subscribers;

FIG. 2 is a schematic diagram of a particularly advantageous embodiment of a memory of the memory device according to the invention shown in FIG. 1, with a FIFO structure in which the FIG. 3a is schematic illustrating a FIFO operating mode.

FIG. 4 is a block diagram of an exemplary embodiment of an implementation of the memory device operated using the methods according to the invention; and FIG. 5 is a similar view of further exemplary embodiment of an implementation of the memory device operated using the methods according to the invention.

DESCRIPTION OF THE PREFERRED EMBODIMENTS

Figure 3A:
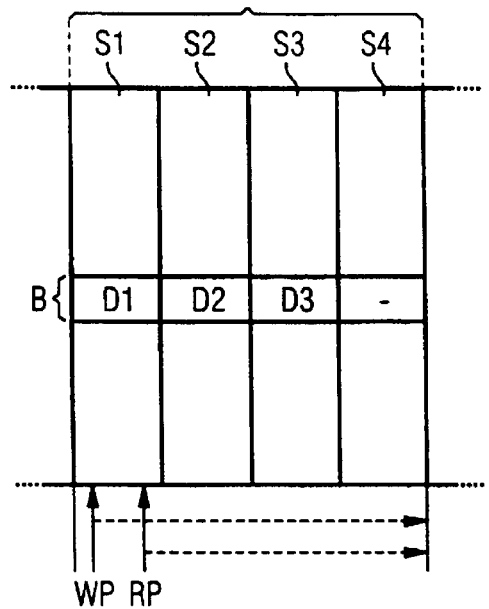
FIG. 3b is a schematic illustrating a gateway operating mode.
FIG. 3c is a schematic illustrating a shared gateway operating mode.
FIG. 3d is a schematic illustrating a FIFO gateway operating mode.
Figure 3B:
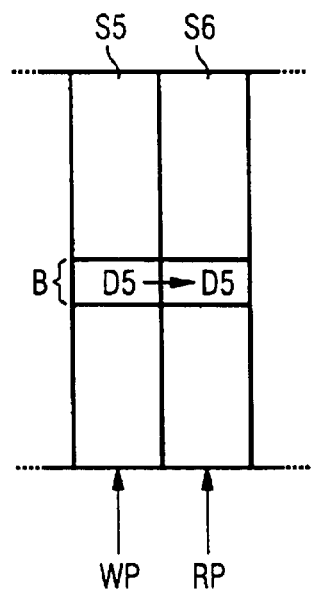
Figure 3C:
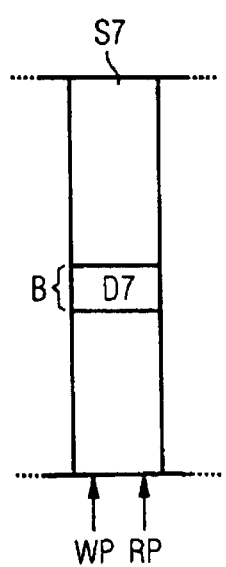

Referring now to the figures of the drawing in detail, wherein, unless otherwise stated, identical or functionally equivalent elements are identified with the same reference symbols in all the figures, and first, particularly, to FIG. 1 thereof, there is seen a memory device 1 according to the invention that is arranged between two subscribers 3, 4 for the purpose of decoupling the data transfer therebetween. In this case, the memory device is connected via one connecting line 2a, 2b each to the two subscribers 3, 4.

Typically, but not necessarily, the two subscribers 3, 4 use a different data transmission rate. Any data transfer direction may be used, that is to say unidirectionally from one of the subscribers 3, 4 to another subscriber 3, 4 or bidirectionally in both directions. In this case, each of the subscribers 3, 4 may operate either as the subscriber 3, 4 transmitting the data and as the subscriber 3, 4 receiving the data. In the following text, the subscriber 3, 4 transmitting the data is referred to as the data transmitter, and the subscriber 3, 4 receiving the data as the data receiver.

Furthermore, the number of subscribers 3, 4 connected to the memory device 1 is not limited to a specific number, and any desired number of subscribers 3, 4 may be connected to the memory device 1. In addition, the specific configuration and/or the function of the subscribers 3, 4 which are connected to the memory device 1 is of no further interest for the purposes of the present invention. Preferred refinements of the these subscribers 3, 4 are described in two exemplary embodiments with reference to FIGS. 4 and 5.

In a known configuration, the memory device 1 has a physical memory 1a as well as a memory control device 1b. The memory control device 1b is connected to the memory 1a via a bus 1c which typically has an address bus, a data bus and a control bus. The memory 1a is organized on an object basis, that is to say the memory 1a contains a multiplicity of memory objects 1d. Typically, but not necessarily, the individual memory objects 1d in the memory 1a are of the same size. According to the invention, each of the memory objects 1d in the memory 1a can be assigned flexibly and individually to each of the (two) connected subscribers 3, 4. These operating modes of the memory objects 1d are described in detail in the following text, with reference to FIGS. 2 and 3.

FIG. 2 shows the design of a particularly advantageous embodiment of a memory of a memory device according to the invention.

In the present exemplary embodiment, the individual memory objects 1d in the memory 1a are divided into three regions A to C. The data contents and the function of these regions A to C are described briefly below:

1. The identification region A essentially contains the address and the identifier of the corresponding memory object 1d. Particularly for CAN applications, the identification region A has a width of 4 bytes. The identifier in this case has a width of 11 bits or 29 bits, in accordance with CAN protocol.
2. The actual data to be transferred are buffer-stored in the data region B. The data region B must be designed to be at least as long as the maximum amount of data which can be transmitted per data object in a data transfer. In the case of CAN applications, the width of the data region B is fixed by the data transmission protocol, and is a maximum of 8 bytes wide.
3. The control region C contains the monitoring and control functions for a data transfer between the subscribers 3, 4. This includes essentially information relating to the arbitration of a memory object 1d for the respectively connected subscribers 3, 4, and relating to the nature and the operating mode of the data transfer. In the case of CAN applications, the size of the control region C is variable, depending on the application.

The various memory objects 1d can, according to the invention, be operated in various operating modes. Four particularly advantageous operating modes are explained in more detail in the following text, with reference to FIG. 3a to 3d. To assist clarity, FIGS. 3a to 3d show only the data regions B with the data objects D1 . . . D10 contained in them, the various memory objects as well as the write pointer WP and the read pointer RP of the data transmitter and data receiver, respectively.

First Operating Mode:

In the first operating mode according to FIG. 3A, four memory objects S1 . . . S4 are arranged to form a first-in, first out structure (FIFO). Such a FIFO can be designed in a known manner as a ring buffer. In the first operating mode, which is also called the "FIFO operating mode" in the following text, the data objects D1 . . . D3 to be transmitted are written via a write pointer WP, which is connected to the data transmitter, to the data regions B provided for this purpose in the memory objects S1 . . . S4 in the FIFO. In this cane, the first data object D1 is written to the data region B of the first memory object S1 in the FIFO. The respectively following data objects D2, D3 are stored in the data regions B of the correspondingly successive memory objects B2, S3.

For the situation in which fewer data objects D1 . . . D3 are transmitted by the data transmitter than the corresponding FIFO can accommodate, that is to say for the situation in which one or more data regions B have still not been written to, a so-called fill-level indication can be provided in one of the memory objects S1 . . . . S4 of the FIFO, to indicate which of the memory objects S1 . . . S4 in the FIFO are empty. Conversely, it would also be conceivable for the data transmitter to transmit more data objects than the corresponding FIFO can accommodate. A device can be provided for this situation which sets a flag, for example once the last or penultimate memory object S3, S4 in the FIFO has been written to, and this flag produces an interrupt signal. The interrupt signal can then be used, for example by the central processor unit, to suppress further data transfer.

Once the data transmitter, via the write pointer WP, has stored a data packet comprising the data objects D1 . . . D3 in the corresponding memory objects S1 . . . S3, the FIFO is released to transmit data. The data transmitter can then read these memory objects S1 . . . S3 via a read pointer RP.

Second Operating Mode:

In the second operating mode, which is also called the "gateway operating mode" in the following text, only two memory objects S5, S6 are provided for the data transfer. The first of these memory objects S5 is assigned to the data transmitter as receiver, and the second memory object S6 is assigned to the data receiver as transmitter. A data object D5 intended for a data transfer is written via a write pointer WP and by the data transmitter to the corresponding data region B in the first memory object S5. This data object D5 is then copied to the corresponding data region B in the second memory object S6. From there, the data object D5 can be read out via the read pointer RP of the data receiver.

Third Operating Mode:

In the third operating mode, which is also called the "shared gateway operating mode" in the following text, only a single memory object S7 is provided for the data transfer. This memory object S7 is in this case assigned both to the data transmitter as receiver and to the data receiver as transmitter. A data object D7 intended for a data transfer is written to the corresponding data region B in the memory object S7. Once it has been written to the memory object S7, this data object D7 can be read out again by the data receiver, via a read pointer RP.

Fourth Operating Mode:

The fourth operating mode, which is also called the "FIFO gateway operating mode" in the following text, represents a mixture of the FIFO operating mode and the gateway operating mode. This operating mode provides for a FIFO having a number of FIFO memory objects S9 to S12 as well as a memory object S8 which is arranged upstream thereof and is operated in the gateway mode. The data objects D9 . . . D11 intended for a data transfer are written via the write pointer WP to the corresponding data region B in the memory object S8, which is operated in the gateway operating mode. The data objects D9 . . . D11 which have just been written to the memory object S8 are then automatically copied to the corresponding data region B in the next free FIFO memory object S9, that is to say the first data object D8 is written to the data region B in the first FIFO memory object S9, and the subsequent data objects D10, D11 are written to the corresponding subsequent memory objects S10, S11. In the present exemplary embodiment, the last memory object S12 in the FIFO is once again empty, that is to say it does not contain any data objects. The data receiver can then once again read out the data objects D9 . . . D11 via the read pointer RP, in the sequence in which they were written to the corresponding memory objects S9 . . . S11.

Figure 3D:
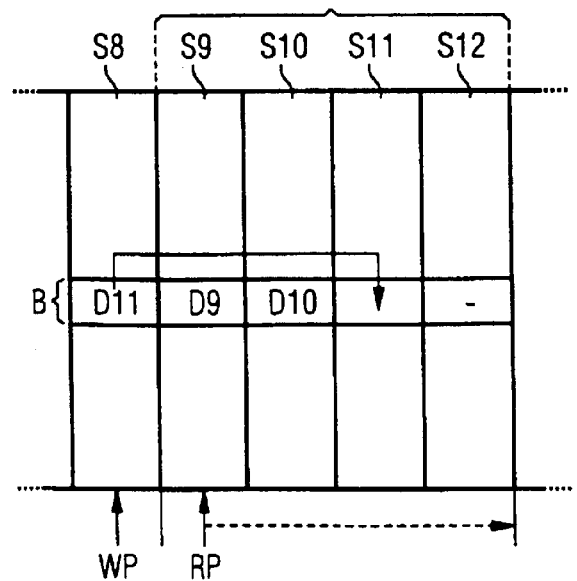

In the exemplary embodiment according to FIG. 3d, the FIFO memory cells S9 . . . S2 are assigned to the data receiver, and the gateway memory object S8 is assigned to the data transmitter. It is also conceivable for the FIFO memory objects to be used as a buffer for reading in data objects, and for the gateway memory object to be used for reading these data objects from the FIFO structure. It would also be conceivable to use two FIFOs operated as gateways, the first FIFO structure being used as a data buffer for reading in data objects, and the second FIFO structure being used as a data buffer for reading out data objects.

The reading-out process in the operating mode described above can be carried out either immediately after the corresponding memory objects have been written to, or not until after a request signal from the data receiver. Furthermore, as for example in the case of a FIFO, the provision of the data objects may itself be used as a request for a data transfer.

In the gateway operating mode and in the FIFO gateway operating mode, it is frequently also advantageous not only for the data objects intended for a data transfer to be copied from one memory object to another memory object, but also for the information contained in the identification region A to be copied, in addition, to the corresponding data objects. Furthermore, it is also possible for a situation to arise in which the entire data region of a memory object has not been written to. In this case, it is than advantageously possible to provide for only those data objects which have been written to the corresponding data region to be copied.

In FIGS. 3a to 3d, it is assumed that just one data object is in each case located in the corresponding data region B of a memory object. It would, of course, also be conceivable for the amount of data in a data object to be transmitted not completely to fill the corresponding data region of the memory object. Alternatively, it would, however, also be conceivable for more than one data object to be provided per memory object.

As already mentioned, FIG. 2 shows a specific exemplary embodiment for operating a memory 1a. The various operating modes which have already been described above have been implemented in a configuration which is particularly advantageous for the data transfer.

The memory 1a, only parts of which are illustrated here, contains a multiplicity of memory objects 1d which are divided into the regions A . . . C. Each memory object 1d can in this case be identified by its binary address, which is contained in the identification region A. The memory objects 1d are arranged in rising address sequence.

The control region C of each memory object 1d contains a so-called gateway control register GCR, which defines the operating mode of the various memory objects 1d. For the situation in which the four different operating modes mentioned above are intended to be used for operating the memory 1a, the gateway control register GCR has a width of two bits and can be designed as follows:

| Register content | Operating mode |
|---|---|
| 00 | FIFO |
| 01 | Gateway mode |
| 10 | Shared gateway |
| 11 | Gateway FIFO |

Furthermore, the control region C of each memory object 1d contains a node selection register NSR, which defines the assignment of the respective memory objects 1d to the connected subscribers 3, 4. In the present example, T3 and T4 mean that the corresponding memory objects 1d are assigned, respectively, to the first subscriber 3 and to the second subscriber 4. As is indicated in FIG. 2, a memory object may in this case be assigned either to the first subscriber (T3), to the second subscriber (T4) or, as in the shared gateway operating mode, to both sub scribers (T3/T4).

The last-mentioned registers GCR, NSR can optionally be initialized by one of the subscribers 3, 4, typically the central processor unit. However, once they have been initialized and for the situation in which no renewed initialization takes place, they are then permanently specified throughout the entire data transfer.

The memory segment of FIG. 2 contains a quadruple FIFO comprising four FIFO memory objects 1d (addresses 01000 . . . 01011). The number of memory objects 1d in a FIFO is advantageously, but not necessarily, a multiple of two. In this situation, the FIFOs can be implemented in a particularly simple manner via their address. In the case of a 5-bit address width, a quadruple FIFO is defined by the respective most significant three digits (MSBS; most significant bits) being identical to the respective address. The two least significant digits (LSBs; least significant bits) in rising form then comprise the four memory objects 1d of the FIFO.

Thus, only the start address of the FIFO and the FIFO width are required in order to define a FIFO. The width of the FIFO, which may be set variably depending on the application, is stored in a specific FIFO width register FLR in the first memory object 1d in the FIFO. In the example corresponding to FIG. 2, the quadruple FIFO thus starts at a memory object 1d whose address ends with the digits 00, and ends at the next memory object 1d, whose address ends with the digits 11. The address-oriented definition of a FIFO thus also defines the fact that a FIFO starts only at memory objects 1d whose address is an even number.

Typically, one of the memory objects 1d in the FIFO, for example the respective first memory object 1d in a FIFO, contains a FIFO fill-level register FFR which indicates how many of the FIFO memory objects 1d are still empty. The contents of the FIFO fill-level register in the present implementation point to the first free memory object 1d in the FIFO.

The memory object which follows the quadruple FIFO, that is to say the memory object 1d having the address 01100, is operated in the present exemplary embodiment in the shared gateway operating mode (see above). The memory object 1d is intended for receiving data from subscriber 4. The data just received are then read out automatically by the subscriber 3.

The four memory objects (addresses 01101 . . . 10000) following this memory object are all operated in the gateway operating mode. In this case, the first memory object pair (address 01101, 01110) is intended for a data transfer of memory objects from subscriber 3 to subscriber 4. The second memory object pair (address 01111, 10000) is, in contrast, intended for a data transfer from subscriber 4 to subscriber 3.

In addition, as indicated in FIG. 2, a memory object 1d (address 00111) which is operated in the gateway mode can be arranged immediately upstream of the quadruple FIFO. In this case, the memory object 1d can also be operated together with the quadruple FIFO in the FIFO gateway operating mode (see above).

In a particularly advantageous refinement, it is possible to provide in the gateway mode for the addresses of the first memory objects 1d of memory object pairs operated in the gateway mode to have odd numbers.

In this way, it is possible to determine in a very simple manner, by means of the implementation and controlled by the addresses and via the control information in the control regions C, which of the memory objects 1d is being operated in the FIFO mode and which in the gateway mode. The functionality of the memory 1a according to the invention is thus under data control and is determined by the specific memory division. The data are in this case not copied randomly backward and forward via the memory 1a, but the data objects of predetermined data regions B are transferred instead of this.

Such a data-controlled data transfer is thus highly flexible, since no additional hardware or software programming is required. In this way, the computation performance of a central processor unit that is connected is not adversely affected, thus avoiding any impairment in the performance capability of the overall communications systems.

The control region C may also optionally contain a so-called transfer status register TSR which defines which of the memory objects 1d are intended for transmitting data (TO) and which are intended for receiving data (RO). However, it is advantageously possible to dispense with such a transfer status register TSR if the assignment is controlled by the data items to be transmitted themselves. For example, it is possible to define in the control region:

that the memory objects 1d in the FIFOs are provided as transmit objects (TO) only for transmitting data objects;

that the respective first memory objects 1d of gateway memory objects are provided as receive objects (RO) only for receiving data objects; and that the memory objects which are operated in the shared gateway mode are likewise provided as receive objects (RO).

The invention is particularly advantageous if one of the subscribers 3, 4 has a very much higher data transmission rate than the other subscriber 3, 4. In this situation, the FIFOs can be used for data buffering between the "fast" and the "slow" subscriber 3, 4. Typically, but not necessarily, the FIFO width depends in particular on the ratio of these data transmission rates.

Furthermore, the configuration of at least some of the memory objects 1d as FIFOs is not exclusively limited to data buffering during a data transfer between a "fast" and a "slow" subscriber 3, 4, but can also advantageously be used, within the context of the invention, for any data transfer where the subscribers 3, 4 are using the same or different data transmission rates.

In particular, memory objects 1d being operated in the FIFO mode can also advantageously be used when, for example, the data transmitter is transmitting data continuously. These data can then be read out of the FIFO, and can be further processed, in collated form, by the data receiver. In this way, owing to shorter access times, the data receiver requires less computation power for the collated read-out process.

Alternatively, it would, of course, also be conceivable for the reading out and further processing of the data to be carried out at the same speed, but with intervals of different length between the write and read cycles. A FIFO allows account to be taken of this situation by matching to the respective application, and to the system design.

FIG. 4 shows an exemplary embodiment of an implementation of a memory device operated using the method according to the invention.

In FIG. 4, the subscribers 3 and 4 connected to the memory device 1 are bus systems. Each of the two bus systems 3, 4, which, for example, may be designed as CAN networks, contains a multiplicity of network nodes 3b, 4b which are respectively connected to a data bus 3a, 4a. The network nodes 3b, 4b of the bus systems 3, 4 are thereby used for data communication with one another. The configuration and the number of individual network nodes 3b, 4b of the respective bus systems 3, 4 as well as the configuration of the respective data buses 11, 21 are of no further importance for the present invention.

A bridge module 5, which contains the memory device 1 according to the invention, is provided for the purpose of data transfer between the two bus systems 3, 4. The memory device 1 is in this case connected via a respective interface circuit 6a, 6b and via connecting lines 2a, 2b in a known manner to each of the data buses 3a, 4a of the bus systems 3, 4. Typically, the data buses 3a, 4a of the two bus systems use different data transmission rates. The memory device 1 in the bridge module 5 thereby be used for decoupling the data transfer between the bus systems whose speeds differ.

FIG. 5 shows a further exemplary embodiment of an implementation of a memory device operated using the method according to the invention.

A bus system 10 is designed, for example, to correspond to one of the bus systems 3, 4 shown in FIG. 4. The bus system 10, which in this case is a CAN network, has a multiplicity of network nodes 12, 12' connected to a data bus 11. The memory device 1, which is integrated in FIG. 5 in one of the network nodes 12', is in this case arranged between a first subscriber 3, which is a CAN module, and a second subscriber 4, which is a CPU module. The memory device 1 is in this case used for decoupling the data transfer between the CPU module 3 (operated at high data transmission rates), and the CAN module (operated at relatively low data transmission rates).

The CAN module 3 is furthermore connected via an interface circuit 13 to the data bus 11 of the bus system 10. The CPU module 4 is connected via an internal bus 14 to further modules 15 in the network node 12'. These further modules 15 may include, for example, a timer module, an interrupt module, an internal memory, the voltage supply for the network node 12', A/D converter modules etc. The memory device 1 is provided only in one of the network nodes 12' in FIG. 5, for reasons of clarity. A memory device 1 according to the invention can also, of course, be provided in a plurality of network nodes 12, 12' connected to the data bus 11, or in each such network node.

The exemplary embodiments according to FIGS. 4 and 5 are based on a memory device in a CAN bus system. However, it will be readily understood that the present invention can also advantageously be used for any other communications system for the purpose of decoupling the data transfer between a data transmitter and a data receiver.

The exemplary embodiments described above indicate preferred and advantageous implementations of the memory device 1 which is operated using the method according to the invention and which is suitable for decoupling the data transfer between at least two connected subscribers 3, 4. The exemplary embodiments and variations are but examples of various advantageous alternatives in which the invention may be implemented. Particularly, various alternatives and combinations of the described examples are within the inventive concept as defined in the following claims.

We claim:

1. In a data transmission system with at least two subscribers, a memory device to be connected, for serial data transfer of binary data objects of a predetermined data width, between the at least two subscribers, comprising:
   a multiplicity of memory objects each being identifiable by a respective address;
   each said memory object having a data width being at least as large as a predetermined data width of a data object intended for data transfer and a node selection register indicating a subscriber to which the respective said memory object is assigned;
   at least one FIFO structure containing a plurality of said memory objects and transmitting data in a data-controlled data transfer controlled by the data objects being transmitted.

2. In a data transmission system with at least two subscribers, a memory device to be connected, for serial data transfer of binary data objects of a predetermined data width, between the at least two subscribers, comprising:
   a multiplicity of memory objects each being identifiable by a respective address;
   each said memory object having a data width being at least as large as a predetermined data width of a data object intended for data transfer and a gateway control register defining an operating mode of the respective said memory object;
   at least one FIFO structure containing a plurality of said memory objects and transmitting data in a data-controlled data transfer controlled by the data objects being transmitted.

3. In a data transmission system with at least two subscribers, a memory device to be connected, for serial data transfer of binary data objects of a predetermined data width, between the at least two subscribers, comprising:
   a multiplicity of memory objects each being identifiable by a respective address and a node selection register indicating a subscriber to which the respective said memory object is assigned, and a gateway control register defining an operating mode of the respective said memory object, and wherein a content of said gateway control register and a content of said node selection register are configurable via at least one of the subscribers and a central processing unit;
   each said memory object having a data width being at least as large as a predetermined data width of a data object intended for data transfer;
   at least one FIFO structure containing a plurality of said memory objects and transmitting data in a data-controlled data transfer controlled by the data objects being transmitted.

4. In a data transmission system with at least two subscribers, a memory device to be connected, for serial data transfer of binary data objects of a predetermined data width, between the at least two subscribers, comprising:
   a multiplicity of memory objects each being identifiable by a respective address;
   each said memory object having a data width being at least as large as a predetermined data width of a data object intended for data transfer, an identification region containing the respective address of said memory object, a data region storing the data objects, and a control region containing monitoring and control functions for the data transfer;
   at least one FIFO structure containing a plurality of said memory objects and transmitting data in a data-controlled data transfer controlled by the data objects being transmitted.

5. The memory device according to claim 4, wherein said memory objects are equal in size.

6. The memory device according to claim 4, wherein the subscribers in the data transmission system are operated at mutually different data transmission rates.

7. The memory device according to claim 4, wherein each of the subscribers is adapted to be a data transmitter and a data receiver.

8. The memory device according to claim 4, wherein each of said FIFO structures has a data-controlled FIFO fill-level register indicating how many of said memory objects in said FIFO structure have already been written to and/or which are empty.

9. The memory device according to claim 4, wherein each said memory object includes a node selection register indicating a subscriber to which the respective said memory object is assigned.

10. The memory device according to claim 9, wherein a content of said node selection register is configurable via at least one of the subscribers and a central processing unit.

11. The memory device according to claim 4, wherein each said memory object includes a gateway control register defining an operating mode of the respective said memory object.

12. The memory device according to claim 11, wherein a content of said gateway control register is configurable via at least one of the subscribers and a central processing unit.

13. The memory device according to claim 4, wherein each said memory object includes a node selection register indicating a subscriber to which the respective said memory object is assigned, and a gateway control register defining an operating mode of the respective said memory object, and wherein a content of said gateway control register and a content of said node selection register are configurable via at least one of the subscribers and a central processing unit.

14. A method of operating the memory device according to claim 4, which comprises;
defining a first operating mode wherein the following method steps are performed:
(a) providing a FIFO structure;
(b) defining the first subscriber as a data transmitter and successively writing, with the data transmitter, a plurality of data objects to successively arranged memory objects in the FIFO structure;
(c) repeating the writing step until all the memory objects in the FIFO structure have been written to or all the data objects intended for data transfer have been stored in respective memory objects in the FIFO structure;
(d) releasing the FIFO structure for a read operation; and
(e) defining the second subscriber as a data receiver reading, with the data receiver, the data objects that have just been written to the respective memory objects in the FIFO structure, in a same sequence as they were written in the writing step.

15. The method according to claim 14, which comprises:
defining a second operating mode wherein the following method step are performed:
(a) providing a memory object pair with two memory objects;
(b) writing, with the data transmitter, a data object intended for data transfer to a first memory object in the memory object pair;
(c) copying the data object from the first memory object to a second memory object in the memory object pair;
(d) reading, with the data receiver, the data object from the second memory object.

16. The method according to claim 15, which further comprises: defining a third operating mode, wherein a first FIFO structure and a second FIFO structure or an individual memory object are provided, wherein the first FIFO structure is operated in the first operating mode for data buffering of the data objects to be read in or read out, and wherein the second FIFO structure or the individual memory object is operated in the second operating mode for reading out or reading in the corresponding data objects.

17. The method according to claim 16, which comprises selectively operating the memory cells in the FIFO structure under data control both in the first operating mode, in the second operating mode, and, selectively, in the third operating mode.

18. The method according to claim 15, which comprises assigning addresses to the respective first memory objects of the FIFO structure that is being operated in the first memory mode with even numbers, and assigning addresses of the respective first memory objects of a memory object pair being operated in the second operating mode with odd numbers.

19. The method according to claim 14, which further comprises defining a fourth operating mode wherein the following method steps are performed:
(a) providing a memory object;
(b) writing, with the data transmitter, a data object intended for data transfer to the memory object;
(c) releasing the memory object for reading; and
(d) reading, with the data receiver, the data object from the memory object.

20. The method according to claim 19, which comprises selectively operating the memory objects under data control in any of the first operating mode, the second operating mode, the third operating mode, and the fourth operating mode.

21. The method according to claim 14, which comprises holding off with reading the memory objects that have been written to until after a request signal from a central processing unit or from the data receiver.

22. The combination according to claim 4, wherein the memory device is integrated in a bridge module, the at least two subscribers are bus systems, and the bridge module is connected between the subscribers.

23. The combination according to claim 4, wherein the first subscriber is a central processing unit, and the second subscriber is coupled to a data bus of a bus system.

24. A Controller Area Network (CAN) bus system, comprising: at least one memory device according to claim 4.

25. In a data transmission system with at least two subscribers, a memory device to be connected, for serial data transfer of binary data objects of a predetermined data width, between the at least two subscribers, comprising:
a multiplicity of memory objects each being identifiable by a respective address;
each said memory object including a data width being at least as large as a predetermined data width of a data object intended for data transfer, a data region storing the data objects, a control region containing monitoring and control functions for the data transfer, and a node selection register indicating a subscriber to which the respective said memory object is assigned;
at least one FIFO structure containing a plurality of said memory objects and transmitting data in a data-controlled data transfer controlled by the data objects being transmitted.

26. The memory device according to claim 25, wherein a content of said node selection register is configurable via at least one of the subscribers and a central processing unit.

27. In a data transmission system with at least two subscribers, a memory device to be connected, for serial data transfer of binary data objects of a predetermined data width, between the at least two subscribers, comprising:

a multiplicity of memory objects each being identifiable by a respective address;

each said memory object having a data width being at least as large as a predetermined data width of a data object intended for data transfer, a data region storing the data objects, a control region containing monitoring and control functions for the data transfer, and a gateway control register defining an operating mode of the respective said memory object;

at least one FIFO structure containing a plurality of said memory objects and transmitting data in a data-controlled data transfer controlled by the data objects being transmitted.

28. The memory device according to claim 27, wherein a content of said gateway control register is configurable via at least one of the subscribers and & central processing unit.

29. In a data transmission system with at least two subscribers, a memory device to be connected, for serial data transfer of binary data objects of a predetermined data width, between the at least two subscribers, comprising:

a multiplicity of memory objects each being identifiable by a respective address;

each said memory object having a data width being at least as large as a predetermined data width of a data object intended for data transfer, a data region storing the data objects, and a control region containing monitoring and control functions for the data transfer, and a node selection register indicating a subscriber to which the respective said memory object is assigned, and a gateway control register defining an operating mode of the respective said memory object, and wherein a content of said gateway control register and a content of said node selection register are configurable via at least one of the subscribers and a central processing unit;

at least one FIFO structure containing a plurality of said memory objects and transmitting data in a data-controlled data transfer controlled by the data objects being transmitted.

30. A method of operating a memory device including a multiplicity of memory objects each being identifiable by a respective address; each said memory object having a data width being at least as large as a predetermined data width of a data object intended for data transfer, a data region storing the data objects, and a control region containing monitoring and control functions for the data transfer; at least one FIFO structure containing a plurality of said memory objects and transmitting data in a data-controlled data transfer controlled by the data objects being transmitted; the method which comprises;

defining a first operating mode wherein the following method steps are performed:

(a) providing a FIFO structure;

(b) defining the first subscriber as a data transmitter and successively writing, with the data transmitter, a plurality of data objects to successively arranged memory objects in the FIFO structure;

(c) repeating the writing step until all the memory objects in the FIFO structure have been written to or all the data objects intended for data transfer have been stored in respective memory objects in the FIFO structure;

(d) releasing the FIFO structure for a read operation, and (e) defining the second subscriber as a data receiver reading, with the data receiver, the data objects that have just been written to the respective memory objects in the FIFO structure, in a same sequence as they were written in the writing step; and defining a second operating mode wherein the following method steps are performed:

(a) providing a memory object pair with two memory objects;

(b) writing, with the data transmitter, a data object intended for data transfer to a first memory object in the memory object pair;

(c) copying the data object from the first memory object to a second memory object in the memory object pair;

(d) reading, with the data receiver, the data object from the second memory object.

31. The method according to claim 30, which further comprises: defining a third operating mode, wherein a first FIFO structure and a second FIFO structure or an individual memory object are provided, wherein the first FIFO structure is operated in the first operating mode for data buffering of the data objects to be read in or read out, and wherein the second FIFO structure or the individual memory object is operated in the second operating mode for reading out or reading in the corresponding data objects.

32. The method according to claim 31, which further comprises defining a fourth operating mode wherein the following method steps are performed:

(a) providing a memory object;

(b) writing, with the data transmitter, a data object intended for data transfer to the memory object;

(c) releasing the memory object for reading; and (d) reading, with the data receiver, the data object from the memory object.

33. The method according to claim 31, which comprises selectively operating the memory cells in the FIFO structure under data control both in the first operating mode, in the second operating mode, and, selectively, in the third operating mode.

34. The method according to claim 32, which comprises selectively operating the memory objects under data control in any of the first operating mode, the second operating mode, the third operating mode, and the fourth operating mode.

35. The method according to claim 30, which comprises assigning addresses to the respective first memory objects of the FIFO structure that is being operated in the first memory mode with even numbers, and assigning addresses of the respective first memory objects of a memory object pair being operated in the second operating mode with odd numbers.

* * * * *